W. ROTTER & R. S. ARTHUR.
PHONOGRAPHIC DOLL.
APPLICATION FILED JUNE 19, 1913.

1,097,771.

Patented May 26, 1914.
6 SHEETS—SHEET 1.

W. ROTTER & R. S. ARTHUR.
PHONOGRAPHIC DOLL.
APPLICATION FILED JUNE 19, 1913.

1,097,771.

Patented May 26, 1914.
6 SHEETS—SHEET 2.

W. ROTTER & R. S. ARTHUR.
PHONOGRAPHIC DOLL.
APPLICATION FILED JUNE 19, 1913.

1,097,771.

Patented May 26, 1914.
6 SHEETS—SHEET 3.

WITNESSES:
Howard H. King.
Mildred E. Brooks.

INVENTORS:
William Rotter
and Richard S. Arthur,
BY
Russell M. Everett
ATTORNEY.

W. ROTTER & R. S. ARTHUR.
PHONOGRAPHIC DOLL.
APPLICATION FILED JUNE 19, 1913.

1,097,771.

Patented May 26, 1914.
6 SHEETS—SHEET 4.

WITNESSES:
Howard R. King
Mildred E. Brook

INVENTORS:
William Rotter
and Richard S. Arthur,
BY
Russell W. Everett
ATTORNEY.

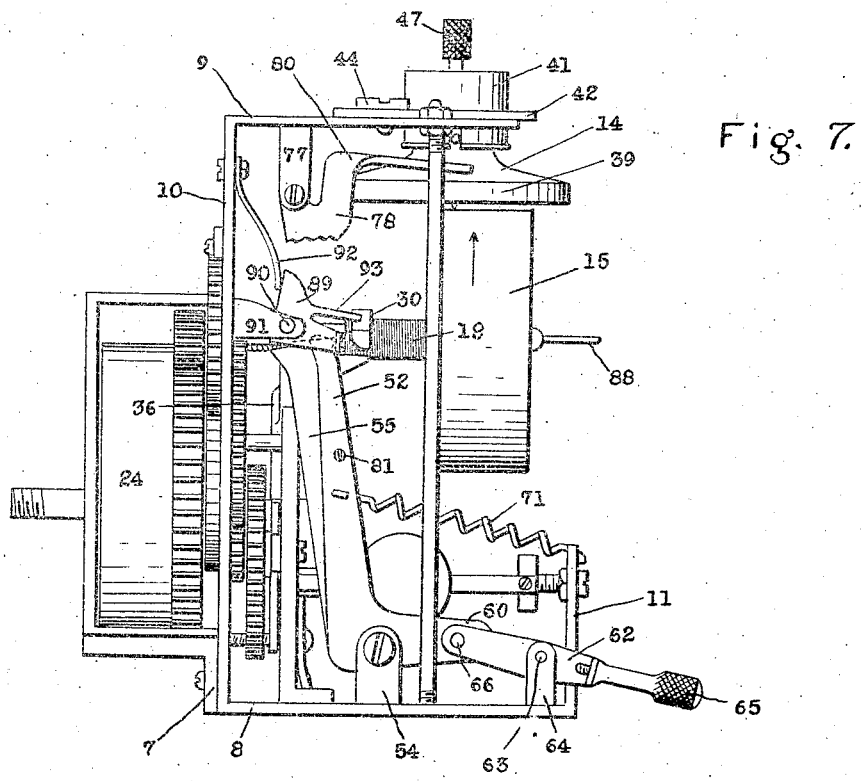

W. ROTTER & R. S. ARTHUR.
PHONOGRAPHIC DOLL.
APPLICATION FILED JUNE 19, 1913.

1,097,771.

Patented May 26, 1914.
6 SHEETS—SHEET 6.

UNITED STATES PATENT OFFICE.

WILLIAM ROTTER AND RICHARD S. ARTHUR, OF NEWARK, NEW JERSEY; SAID ARTHUR ASSIGNOR TO SAID ROTTER.

PHONOGRAPHIC DOLL.

1,097,771.  Specification of Letters Patent.  Patented May 26, 1914.

Application filed June 19, 1913. Serial No. 774,509.

*To all whom it may concern:*

Be it known that we, WILLIAM ROTTER and RICHARD S. ARTHUR, citizens of the United States, residing at Newark, in the county of Essex and State of New Jersey, have invented certain Improvements in Phonographic Dolls, of which the following is a specification.

The objects of this invention are to provide a doll in which sound reproducing apparatus is arranged so that the doll will appear to talk; to obtain the issuance of sound from the proper part of the doll's body; to enable the sound reproducing apparatus to be conveniently operated and controlled, and records to be readily and easily changed; to arrange the parts of the apparatus so that they will not be easily tampered with; to provide means for retaining the record drum in idle position to receive the thrust required to insert a record; to provide improved means for releasing the feed nut from the thread bar when the record has been played; to provide improved means for returning the record to its initial position after having been played and the feed nut removed; to provide means for positively removing the sapphire from the record during the return of the record to initial position; to maintain the feed nut in true relation to the thread bar; to secure simplicity of construction and operation, and to obtain other advantages and results as may be brought out in the following description.

Figure 1:
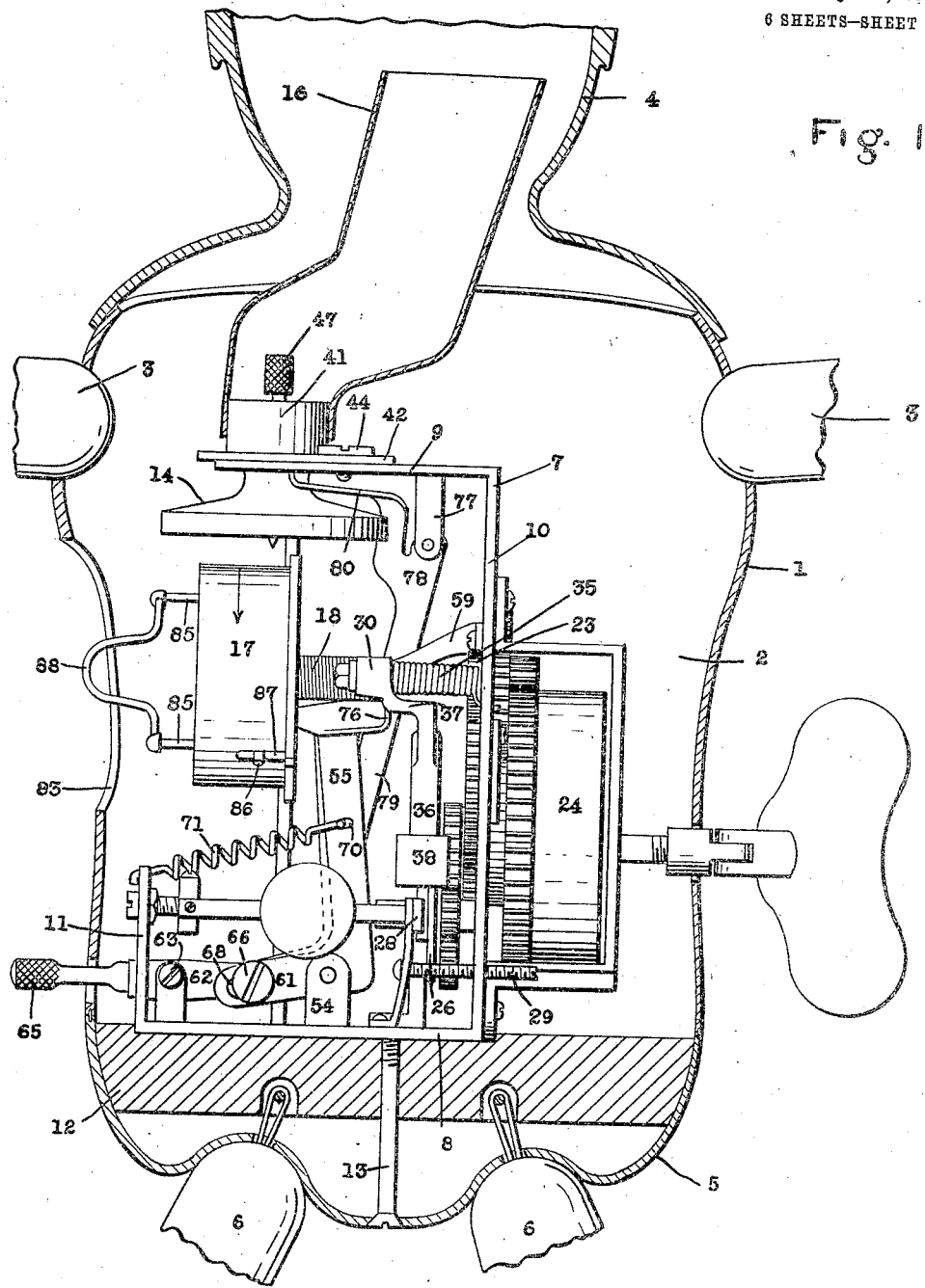
Figure 2:
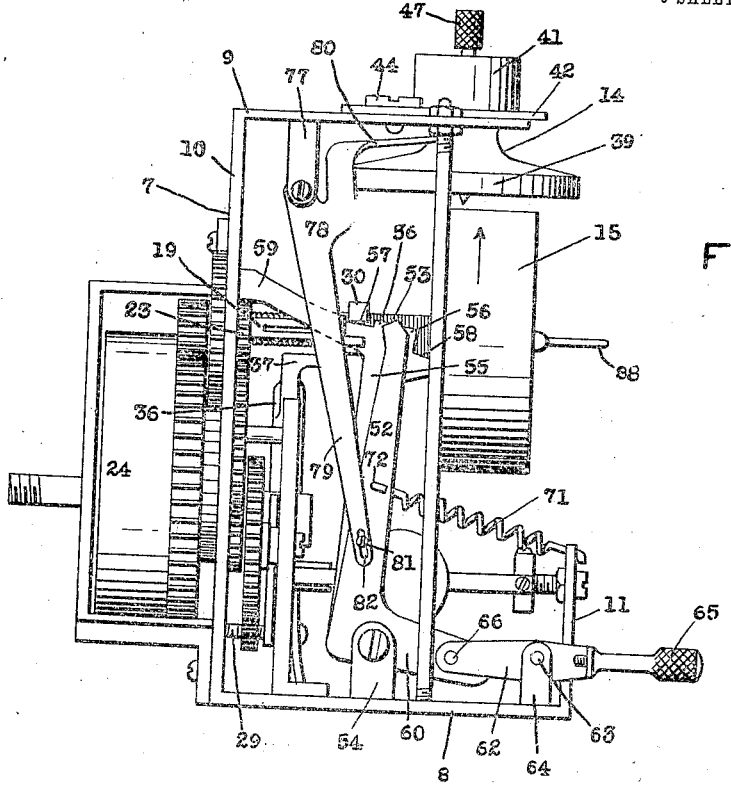
Figure 3:
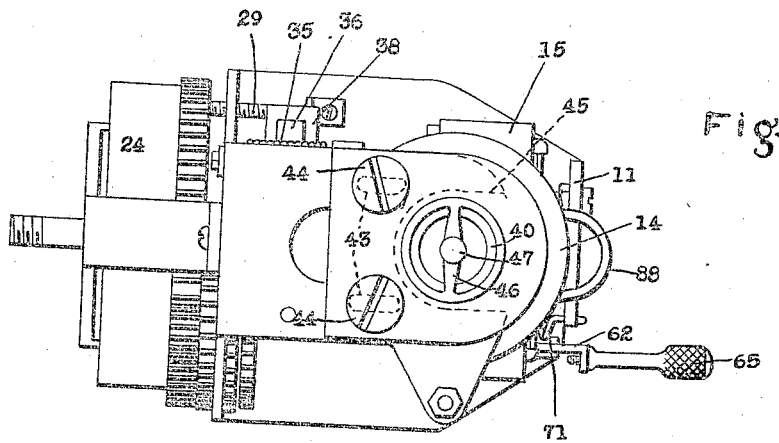
Figure 4:
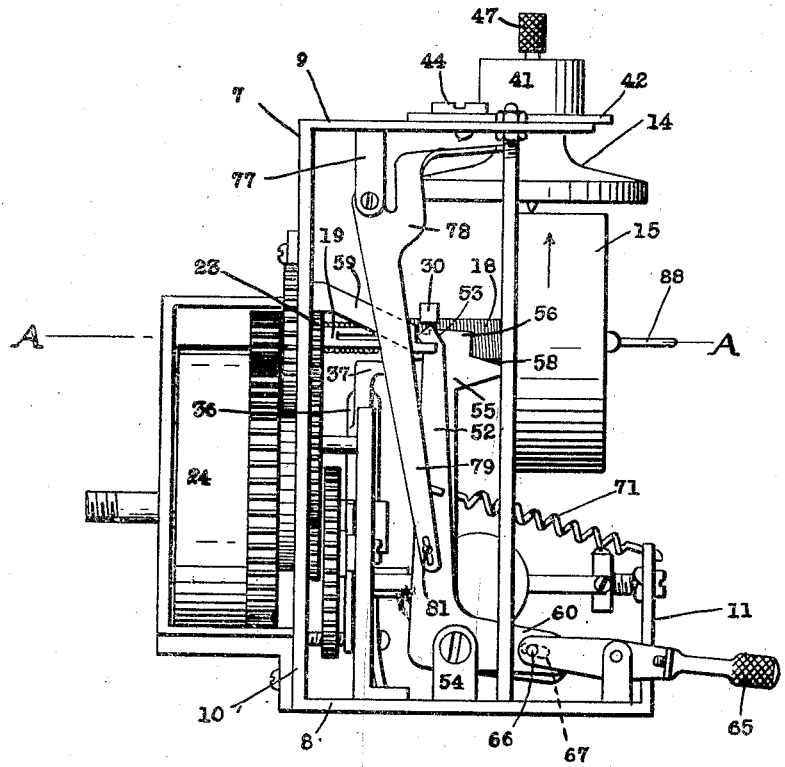
Figure 5:
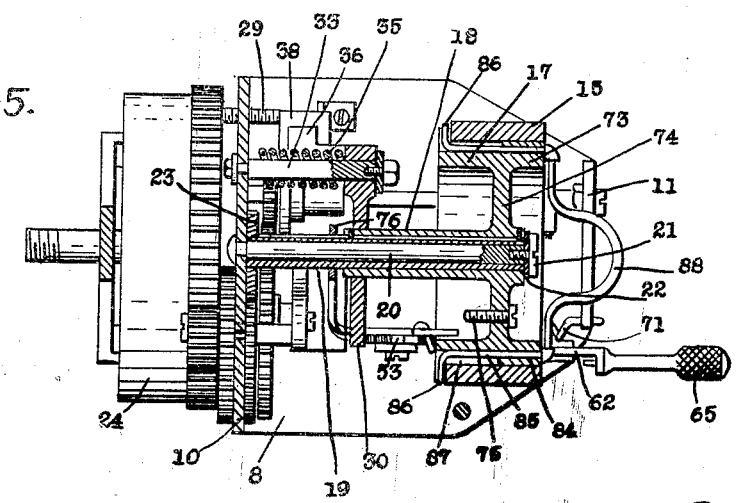
Figure 6:
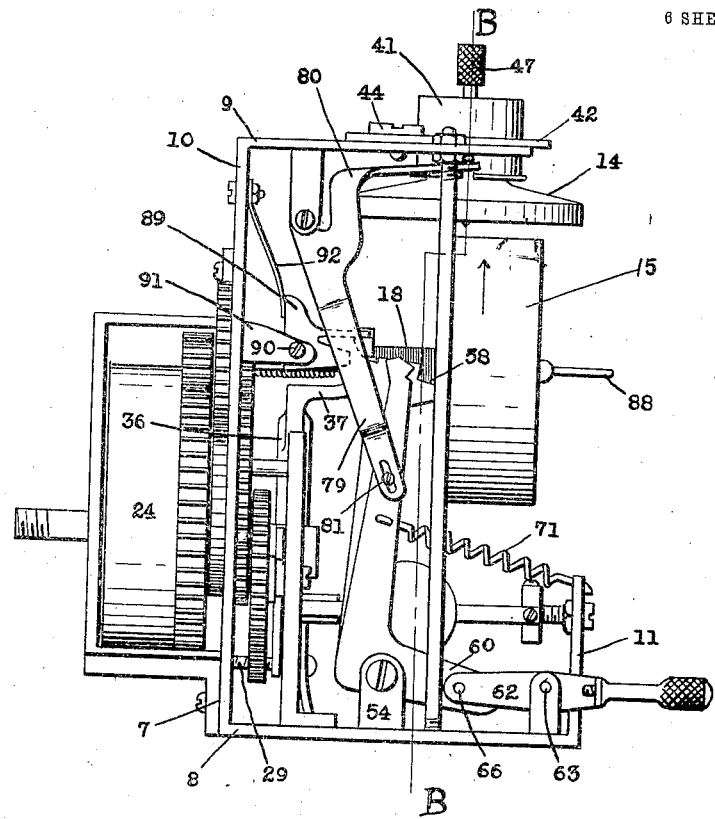
Figure 10:
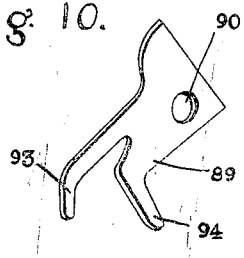
Figure 11:
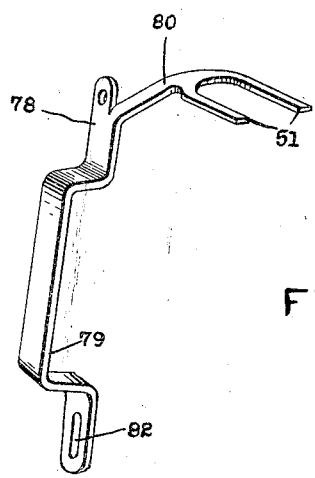
Figure 8:
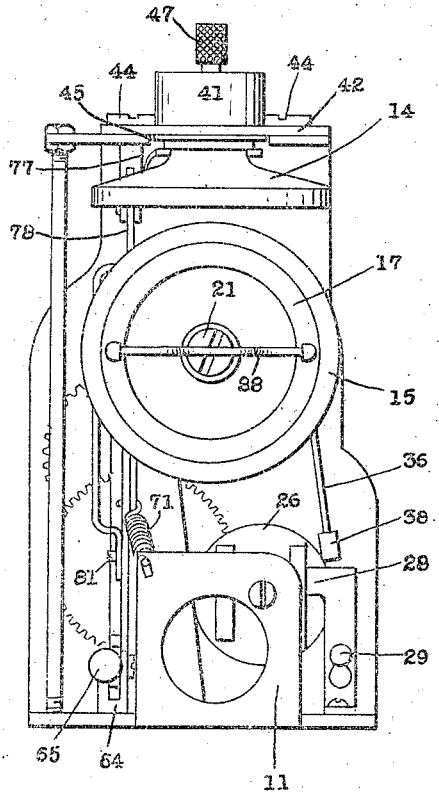
Figure 9:
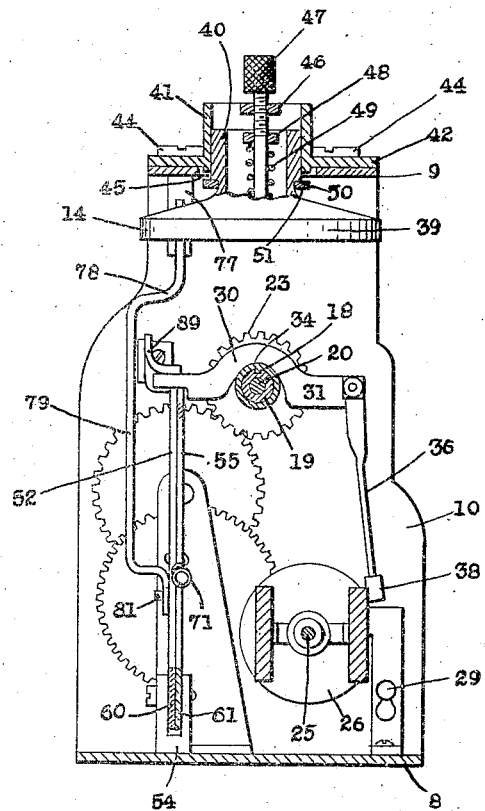

Referring to the accompanying drawings, in which like numerals of reference indicate the same parts throughout the several views, Figure 1 is a central sectional view through a doll, looking from the back toward the front of the same, and showing our improved mechanism mounted therein; Fig. 2 is a view of said mechanism from the front with the doll body removed; Fig. 3 is a top view of the same; Fig. 4 is a view similar to Fig. 2, showing the operating lever partly depressed; Fig. 5 is a sectional view on line A—A of Fig. 4 looking down; Fig. 6 is a view similar to Fig. 2 showing a modified construction with a detent for holding certain levers while the record is being played; Fig. 7 is a similar view showing said levers engaged by the detent; Fig. 8 is an elevation looking from the right hand side of Fig. 6; Fig. 9 is a vertical sectional view taken on line B—B of Fig. 6; Fig. 10 is a perspective view of the detent for retaining said levers; Fig. 11 is a perspective view of the arm for raising the reproducer; Fig. 12 is a perspective view of the feed nut and its attached brake; Fig. 13 is a perspective view of a certain raising lever, and Fig. 14 is a similar perspective view of a locking lever.

In the specific embodiment of the invention illustrated in said drawings, the reference numeral 1 indicates the torso or body of a doll, made up of an upper section 2 carrying the arms 3, 3 and head 4, and a lower section 5 carrying the legs 6, 6, said sections being secured together in any desired or well-known manner. Within the said torso or body 1 is a strap metal frame 7 for carrying the various mechanisms hereinafter described, said frame comprising a bottom plate 8, a top plate 9 substantially parallel to the bottom plate and a connecting side piece 10 preferably perpendicular to the top and bottom plates. From the free end of the bottom plate 8 an extension 11 is turned upward for a short distance substantially parallel to the side piece 10 for purposes hereinafter described. Said frame is supported in upright position within the upper section 2 of the doll body upon a bed or filler block 12 in the lower section 5, a screw 13 being shown introduced centrally upward from the bottom of the lower section through the filler and screwing into the bottom plate 8 of the frame to clamp the several parts together. Any suitable means may be employed to prevent twisting of the frame on the filler, but as here shown said filler is recessed to receive the bottom plate of the frame.

The phonographic reproduction of sound is obtained by a reproducer 14 on the top plate 9 coacting with a cylindrical record 15 therebeneath, and in order to issue the sound from the head 4 of the doll a horn 16 extends upward from the reproducer through the neck of the doll into the head. Said cylindrical record 15 is frictionally held upon a drum 17 fixed on a thread-bar 18 slidably splined on a rotatable spindle 19. It is to be understood that said spindle is mounted intermediate of and substantially parallel to the upper and lower plates of the frame and extends from side to side of the doll. For so mounting the spindle, an axle 20 is riveted or otherwise firmly secured to the side piece 10 to project inwardly of the frame, and extend longitudinally through the spindle. The axle 20 is preferably the same length as the spindle and is suitably recessed at its free or outer end to receive a screw 21, the head of which, together with an interposed washer 22, overlies the end of said spindle to prevent longitudinal displacement thereof. A gear-wheel 23 fast on the spindle 19 at its end adjacent the side piece of the frame, receives its rotary movement through a suitable train of gearing from a spring shown within a casing 24 as is usual and customary in the art. This train of gearing preferably includes a governor comprising a rotating governor shaft 25 carrying a friction disk 26 adapted to be slid by the centrifugal action of weights as is usual in governors of the centrifugal expanding type. As the governor shaft 25 gains speed the friction disk 26 is thus brought into contact with a brake 28 supported from the bottom plate 8 of the frame and which is held in adjustable relation to the normal position of the friction disk by means of a screw 29 from the side piece 10 of the frame. An approximately constant speed of rotation of the record is therefore provided, the rate of which can be adjusted as desired.

The feed nut 30 (see Figs. 5, 9 and 12) to coact with the thread bar 18 to advance the record, consists of an arm 31 projecting forwardly across the thread bar from a rod 33 on which said arm is pivotally mounted, as by a transverse hole 32 through itself. Said arm is also hollowed or recessed at its under side intermediate of its ends, as at 34, and threaded for said hollowed or recessed portion so that as the arm rests on the rotating thread bar 18 said bar is fed longitudinally as desired. The pivot rod 33 carrying the feed nut is shown affixed to the side piece 10 of the frame projecting inwardly therefrom substantially on a level with and parallel to the thread bar, and carrying upon itself a spiral spring 35 fastened at its one end to the side piece and resting upon the feed nut 30 at its other end to exert a constant depressing force thereon. A depending brake arm 36 secured to the feed nut at its pivoted end by an offset 37 carries at its lower end a brake 38 adapted to engage the periphery of the friction disk 26 of the governor when the feed nut is raised, thereby stopping the rotation of the several parts.

During the rotation and consequent advancement of the record as above described, the reproducer 14 above referred to engages the same to produce the sound. This reproducer comprises a circular head 39, tapering upwardly inward from its peripheral edge to an upwardly projecting neck 40 integral therewith. Said neck 40 is slidably mounted in a collar 41 carried by the top plate 9 of the frame 7, said collar being integral with or secured to an auxiliary plate 42 having slots 43, 43 through which extend clamping screws 44, 44 for adjustably securing said auxiliary plate 42 to the top plate. The neck 40 of the reproducer depends from the collar 41 through an enlarged slot 45 in the top plate, said slot being open at the free end of said top plate so that the auxiliary plate 42 may be removed with the reproducer. By virtue of this enlarged slot 45 and the screw slots 43 it will be obvious that the reproducer may be adjusted to any desired position.

Extending diametrically across the upper end of the collar 41 slidably supporting the reproducer is a bridge or plate 46 having at its center a tension adjusting screw 47 depending axially coincident into the collar 41 and provided with an annular lateral flange or shoulder 48 adjacent its lower end against which abuts a spring 49 for adjusting the tension on the diaphragm (not shown) within the reproducer. The neck 40 of the reproducer is provided with an undercut recess 50 into which fit fingers or ends of a yoke 51 for raising the reproducer as will be hereinafter described.

For controlling the feed nut 30 to raise or lower the same whereby the brake 38 is simultaneously applied or released, we provide a raising lever 52 having a tapered upper end 53 and pivoted in a bracket 54 on the bottom plate 8 of the frame to swing transversely to the arm 31 of the feed nut 30. A locking lever 55 is shown mounted upon the same fulcrum as the raising lever and beside the same, said locking lever being provided with a stepped upper end having a middle elevation 56 over which the feed nut must be raised to place the same in its operative position from the inoperative position or vice versa. A relatively shallow recess 57 is provided at the side of this elevation 56 away from the record, in which the feed nut may rest and be maintained thereby out of engagement with the thread bar. On the opposite side of the elevation 56, or the side toward the record, is provided a relatively deep recess 58 so that the feed nut may drop lower and engage the threads of the feed bar. As it is desirable to support the outer end of the feed nut, when in such lowered position so that its threads mesh with those of the feed bar, without excessive pressure due to its depressing spring 35, and as it is not practicable to obtain sufficient precision in the step on the locking lever to do this, we provide a rest 59 projecting from the side piece 10 of the frame and sufficiently rigid to accurately do this. Because of the middle elevation 56 on the locking lever 55 it is impossible to swing said locking lever from either of its extreme positions until the feed nut has been lifted over said elevation. As shown in Fig.

2, the feed nut is in the shallow recess 57 of this locking lever, and in order to get it into the other or deeper recess 58 the raising lever 52 is first swung as shown in Fig. 4, it being noted that the engagement of the tapered end 53 of said raising lever lifts the feed nut above the elevation of the locking lever so that said locking lever can swing away from the record. For so operating the two levers 52 and 55, they have lower bell-crank arms 60, 61, respectively, arranged side by side in the planes of the levers. A controlling lever 62 pivoted as at 63 to a bracket 64 on the bottom plate 8 of the frame has a finger piece 65 at its outer end and has its inner end at one side of said arms 60, 61, substantially parallel thereto and closely adjacent to them. A transverse screw 66 or the like in said inner end of the controlling lever extends through and engages the sides of a slot 67 in the raising lever arm 60, (see Fig. 4), and also projects through a wider slot 68 in the locking lever arm 61, (see Fig. 1), so that an initial movement of the controlling lever is not transmitted immediately to said last-mentioned arm 61. A transverse slot 70 is also provided in the upright main portion of the locking lever 55 through which extends the end of a spiral tension spring 71 said end hooking also through a registering hole 72 in the raising lever which it fits more closely, whereby both of said levers are normally drawn toward the record and yet they can swing independently to a limited extent, see Figs. 1 and 2.

The drum 17 for holding the record 15 preferably provides a rim 73 and a radial web 74 from which projects a trip 75, here shown as a screw, although any equivalent could be used. As the drum is rotated and advanced it approaches the feed nut, and by the time the record is played said trip 75 engages under the feed nut and raises the same, releasing the locking lever, whereupon the tension in the spring 71 draws both levers toward the record into the position shown in Fig. 1. Simultaneously with this movement of the levers the drum 15 and record are returned to initial position and to do this the locking lever is provided at its top with a fork 76 slidably straddling the drum-carrying spindle 19 and adapted to engage flatwise against the inner end of the thread-bar 18, so that when the lever is drawn over by the spring said thread-bar, with the attached drum, is slid outward or back to initial position. As the feed nut prevents movement of the locking lever after entering the shallow recess 57 thereof, the thread-bar and drum are consequently prevented from sliding back after being slid to initial position.

Simultaneous with the return of the record to initial position it is desirable to raise the reproducer from off the record. To this end we pivot in a depending bracket 77 from the top plate 9 of the frame, a bell-crank lever 78 with one arm 79 thereof extending downward and the other arm 80 extending toward the reproducer and carrying the yoke 51 previously referred to the fingers of which engage in the undercut recess 50 of the reproducer. Obviously by swinging the bell-crank lever 78 the reproducer may be raised or lowered, and we thus operate said bell-crank lever by a pin 81 on the raising lever 52 entering a slot 82 at the lower end of the bell-crank arm 79, so that as the raising lever 52 is swung away from the record and the record starts to rotate, the reproducer is lowered with its stylus in engagement with the record. When the levers and the record are returned at the end of the reproduction the bell-crank 78 raises the reproducer out of engagement with the record.

In order to provide means whereby the record may be drawn off the drum and removed through a small aperture 83 in the side of the doll, we bore suitable diametrically opposite holes 84 in the rim of the drum through which extend wires or hooks 85 having their inner ends 86, 86 extending radially of the drum outward from the center to overlie the end of the record, as shown in Fig. 5. Suitable outwardly open slots 87, 87 expose the holes 84, 84 part way across the drum, in which the hooked ends 86 may travel, and a bail 88 is secured to the outer ends of the wires 85 by which they may be pulled simultaneously. The hooked ends 86, 86 engaging the edge of the record will obviously draw the record off the drum as far as the slots 87 will allow the wires to be pulled and it can then be grasped and readily withdrawn by the fingers of the operator.

In Figs. 6 to 10, inclusive, we have shown a catch or detent 89 behind which the raising lever 52 and locking lever 55 may be caught, and held when the reproduction of sound takes place, instead of held by the feed nut as heretofore described. Said catch is pivoted as at 90 to a bracket 91 on the side piece 10 of the frame and is held normally depressed by a spring 92 here shown as a leaf spring secured to said side piece, an upper finger 93 of the catch resting on top of the feed nut. A lower finger 94 lies in the path of the raising lever 52 and the locking lever 55, so that when they are swung they catch behind said lower finger 94 and are held by it. When the feed nut is raised by the trip 75 on the drum, the upper finger 93 of the catch, overlying the feed nut, will cause the catch to be raised also and its lower finger 94 freed from the levers 52, 55 to allow them to return to initial position.

One of the leading features of our improved construction is that the threaded feed bar carrying the record drum extends only one side of said drum, so that records can be readily removed and put onto said drum from its other side. Because of this, the side or end of the drum away from the side piece 10 of the frame is fully exposed, the frame being discontinued below and above the drum as clearly shown in the drawings. Removal and replacing of records with respect to the drum is therefore greatly facilitated, and at the same time the action of the mechanism is not impaired, because of the long bearing afforded by the hollow feed bar upon the spindle beneath. Furthermore, perfect rotation of the drum is secured from the spindle at the same time it is permitted to slide on said spindle, by means of the slot and key connection between said parts. Obviously, a single slot or a plurality of them may be employed, and the key may vary in form, or other suitable equivalents suggesting themselves to those skilled in the art may be employed.

Another leading feature of our construction is the use of the raising lever and locking lever together with means for operating these by a single controlling lever, and through them operating other parts such as the brake and reproducer lifter. It will be understood that various detail changes could be made in the construction and operation of these parts without departing from the spirit and scope of our invention. In fact we do not wish to be understood as limiting ourselves by any of the positive descriptive matter employed herein to illustrate our invention and intend the following claims to be construed as broadly as the state of the art will permit.

Having thus described the invention, what we claim is:—

1. In a sound reproducing mechanism, the combination of a fixed axle having a free projecting end, a tubular spindle on said axle, an exteriorly threaded tubular feed bar slidably keyed to said spindle, a drum on said feed bar, means for releasably retaining said spindle on said axle, and means for rotating said spindle.

2. In a sound reproducing mechanism, the combination of a fixed axle, a tubular spindle rotatably mounted on said axle, a feed bar slidably keyed to said spindle, a drum on said feed bar, and means for actuating said spindle and feed bar.

3. In a sound reproducing mechanism, the combination of a spindle having a free projecting end, means for holding said spindle against longitudinal movement, means for rotating said spindle, a drum rotatably fast on said spindle, means between said drum and the supported end of the spindle for sliding said drum longitudinally on the spindle, and means for holding said sliding means out of engagement during rotation of said spindle.

4. In a sound reproducing mechanism, the combination with a threaded feed bar, of a feed nut pivoted to swing transversely of said feed bar, a spring normally holding said feed nut in engagement with the feed bar, a drum on said feed bar, a trip on said drum adapted to disengage the feed nut, means for automatically locking said feed nut in disengaged position, and means for releasing said locking means.

5. In a sound reproducing mechanism, the combination of a motor, a brake wheel, and a threaded feed bar adapted to be driven by said motor, of a member pivoted to swing transversely of said feed bar forming at one end a feed nut to engage said feed bar and at its other end having a brake to engage said brake wheel, a spring normally holding said feed nut in engagement with the feed bar and said brake disengaged from the brake wheel, means for automatically disengaging said feed nut and engaging the brake, and means for releasing said parts.

6. In a sound reproducing mechanism, the combination with a threaded feed bar, of a feed nut normally engaging said feed bar, a spring controlled locking lever adapted to automatically hold said feed nut in released position, a detent for holding said lever out of engagement with the feed nut, means rotated by the feed bar for automatically releasing the feed nut and detent, and means for swinging the locking lever to again engage the feed nut with the feed bar.

7. In a sound reproducing mechanism, the combination of a threaded feed bar, a feed nut normally engaging said feed bar, means for automatically releasing said feed nut from the feed bar, a locking lever having a stepped end adapted to lock with the feed nut either engaged with or released from the feed bar, a raising lever adapted to release the locking lever, and a single controlling lever for operating both said locking lever and raising lever.

8. In a sound reproducing mechanism, the combination of a threaded feed bar, a feed nut normally engaging said feed bar, means for automatically releasing said feed nut from the feed bar, a locking lever for holding said nut released, a raising lever for releasing said locking lever whereby it may be swung to allow the feed nut to engage the feed bar, and a controlling lever for operating both said locking lever and raising lever.

9. In a sound reproducing mechanism, the combination with a threaded feed bar, a feed nut normally engaging said feed bar, means for automatically releasing said feed nut from the feed bar, a bell-crank locking lever for holding said nut released, a bell-crank raising lever at the side of said locking lever for releasing the same whereby said levers may be swung to allow the feed nut to engage the feed bar, said locking lever and raising lever having operating arms arranged side by side, and a controlling lever connected to said operating arms of said locking and raising levers away from their arms next the feed nut.

10. In a sound reproducing mechanism, the combination with a threaded feed bar, a feed nut normally engaging said feed bar, means for automatically releasing said feed nut from the feed bar, a locking lever for holding said feed nut released from the feed bar, a raising lever upon the same fulcrum with said locking lever and adapted to release the same whereby said levers may be swung to admit engagement of the feed nut with the feed bar, a controlling lever, and a connecting pin extending through said controlling lever and locking and raising levers, said pin having more lost motion with respect to one of said last-mentioned levers than the other.

11. In a sound reproducing mechanism, the combination with a threaded feed bar, a feed nut normally engaging said feed bar, means for automatically releasing said feed nut from the feed bar, a locking lever for holding said feed nut released from the feed bar, a raising lever upon the same fulcrum with said locking lever and adapted to release the same whereby said locking lever may be swung to admit engagement of the feed nut with the feed bar, a controlling lever, a connecting pin extending through said controlling lever and locking and raising levers, said pin having more lost motion with respect to one of said last-mentioned levers than the other, and a spring for holding said levers in normal position, the same lever which has more lost motion with respect to the controlling lever having also more lost motion with respect to said spring.

12. In a sound reproducing mechanism, the combination with a threaded feed bar, of a feed nut normally engaging said feed bar, means for automatically releasing said feed nut, means for automatically locking said feed nut in released position, a raising lever for disengaging said locking lever, and means operated by the movement of said levers for raising and lowering the reproducer with respect to the record.

13. In a sound reproducing mechanism, the combination of a threaded feed bar adapted to slide longitudinally of itself, a feed nut held against movement longitudinally of said feed bar, means for yieldingly holding said feed nut in engagement with said feed bar, a raising lever for lifting said feed nut away from said feed bar, a locking lever for holding said feed nut raised, and a controlling lever for operating both said raising lever and locking lever.

14. In a sound reproducing mechanism, the combination of a threaded feed bar adapted to slide longitudinally of itself, a feed nut held against movement longitudinally of said feed bar, means for yieldingly holding said feed nut in engagement with said feed bar, a raising lever for lifting said feed nut away from said feed bar, a locking lever for holding said feed nut raised, means for resiliently holding said levers in position to keep the feed nut away from the feed bar and means adapted by a single movement of itself to operate both said levers and engage the feed nut with the feed bar.

WILLIAM ROTTER.
RICHARD S. ARTHUR.

Witnesses:
HOWARD P. KING,
JANET A. AYERS.